United States Patent [19]
Fielder et al.

[11] Patent Number: 6,049,612
[45] Date of Patent: Apr. 11, 2000

[54] FILE ENCRYPTION METHOD AND SYSTEM

[75] Inventors: Guy L. Fielder; Paul N. Alito, both of Austin, Tex.

[73] Assignee: The PACid Group, Austin, Tex.

[21] Appl. No.: 09/221,521

[22] Filed: Dec. 28, 1998

Related U.S. Application Data

[63] Continuation of application No. 08/813,459, Mar. 10, 1997.

[51] Int. Cl.$^7$ .................................................. H04C 9/00
[52] U.S. Cl. ............................................................ 380/44
[58] Field of Search .................................. 380/3, 25, 44; 706/41

[56] References Cited

U.S. PATENT DOCUMENTS

| | | | |
|---|---|---|---|
| 4,193,115 | 3/1980 | Albus | 706/41 |
| 5,699,427 | 12/1997 | Chow et al. | 380/3 |

*Primary Examiner*—Salvatore Cangialosi
*Attorney, Agent, or Firm*—Gerald E. Lester

[57] ABSTRACT

A file security system is disclosed in which both a deterministic, non-predictable, pseudo-random, symmetric encryption key and an encrypted information file are highly resistant to cryptographic analysis or brute force trial-and-error attacks. The encryption key is formed by first combining a constant value and a secret E-Key Seed in accordance with a logic, algebraic, and/or encryption function to shuffle bits and perform a first many-to-few bit mapping to provide a first pseudo-random result, and by operating upon the result with a secure one-way hash algorithm to perform a second many-to-few bit mapping and thereby provide a pseudo-random message digest. The message digest may be truncated to provide a deterministic encryption key. The information file to be protected is then encrypted with the encryption key, and thereafter the encryption key is destroyed by the file manager of the host system. The encrypted information file and the constant value then are concatenated, and the result is operated upon by a secure hash algorithm to provide a message integrity code. The constant value and a constant value checksum are inserted as headers at the beginning of the encrypted file, and the message integrity code, a redundant constant value, and a redundant constant value checksum are added as trailers at the end of the encrypted file. Any alteration of the encrypted file is reflected by the message integrity code. If a comparison of the constant value and redundant constant value indicates a match, the encryption key may be regenerated. If no match occurs, the checksums are tested to determine which of the constant value and redundant constant value is correct in order to regenerate the encryption key.

19 Claims, 2 Drawing Sheets

FILE ENCRYPTION METHOD AND SYSTEM

This application is a continuation of Ser. No. 08/813,459 filed Mar. 10, 1997.

FIELD OF THE INVENTION

The invention relates generally to a method and system for protecting an information file from unauthorized access, and more specifically to the encryption of a message or file in accordance with a deterministic encryption key which is highly resistant to discovery through brute force attack or cryptographic analysis, and which obviates the need for key directories or other permanent key management records.

RELATED APPLICATIONS

Copending applications filed on the same date and having same inventors are "Secure Deterministic Encryption Key Generator System and Method", Ser. No. 08/813,992; "Bilateral Authentication And Information Encryption Token System And Method", Ser. No. 08/815,403; and "Bilateral Authentication And Encryption System And Method", Ser. No. 08/813,457.

BACKGROUND OF THE INVENTION

When computer systems were comprised of a mainframe central processing unit (CPU) and a number of dumb terminals, data file protection consisted of protecting against unauthorized access to the CPU, since all sensitive information resided in CPU memory. With the introduction of the personal computer (PC), a migration to local computing through the use of centralized host/server systems began. Again, the conventional wisdom was that sensitive information could be protected by guarding against unauthorized access to the host/server system.

Both desktop and laptop PCs over the past few years have rapidly increased their computing power, and have rapidly increased their local storage capacity due to the falling cost per megabyte of hard disk memory. The mobility of PCs through use of cellular as well as cable networks, the shift from centralized host/server systems to distributed systems, and the interconnection of LANs (local area networks), WANs (wide area networks), and the Internet have further exacerbated the problem of protecting sensitive information in such a decentralized environment.

The most widely accepted method of protecting information stored in a computer system or communicated over networks is the use of data encryption. Data encryption technology is basically classified into two technology types: symmetric or asymmetric. An example of a symmetric encryption algorithim is provided in the Data Encryption Standard, FIPS PUB 46-2; DATA ENCRYPTION STANDARD (DES), Dec. 30, 1993. The RSA encryption technology named for its inventors, Rivest, Shamir, and Adleman, is an example of asymmetric or public key encryption.

Symmetric encryption uses the same key to both encrypt and decrypt an information file. Asymmetric encryption uses two keys which share a relationship such that information encrypted with one key can be decrypted only with the second key. Symmetric encryption is much faster than asymmetric encryption, and is therefore better suited for bulk encryption of data files.

Encryption algorithms are characterized as being either reversible or irreversible. Symmetric and asymmetric encryption algorithms are reversible. A reversible algorithm is one where data is recoverable from its encrypted state back to its cleartext state. An example of an irreversible algorithm is the secure hash algorithm as defined in FIPS PUB 180-1, SECURE HASH STANDARD (SHS), Apr. 17, 1995. Secure hash algorithms were originally used to detect alterations to an information file, whether intentional or unintentional. It is not surprising, therefore, that the output of the algorithm is called a message integrity code (MIC) or message digest (MD). Other characteristics of hash algorithms are that the output is always the same binary length regardless of the size of the input. Thus, an input having a large binary length may be mapped to an output having a shorter binary length. Further, if only one bit in a message or file is changed, approximately 50% of the bits in the output change. There is no known relationship between the input and output of a hash algorithm which may be used to recover the input from the output Thus, even brute force trial-and-error attacks become prohibitive in time and cost.

Encryption keys may in addition be classified as deterministic or non-deterministic. A deterministic encryption key is one which is repeatable each time a specific input is applied to the encryption key generator. Different inputs produce different outputs. A non-deterministic encryption key is one which cannot be repeated with a same input to the encryption key generator. For example, a random number generator provides a non-deterministic result.

File encryption methods and systems are disclosed in U.S. Pat. Nos. 5,421,006; 5,065,429; 5,309,516 and 5,495,533. U.S. Pat. No. 5,421,006 discloses the use of an integrity verification system, but does not disclose the generation of a substantially irreversible and deterministic encryption key, the use of many-to-few bit mapping, or the recovery of constant value headers. U.S. Pat. No. 5,065,429 does not disclose the generation of a substantially irreversible and deterministic encryption key, a message integrity code, or the use of many-to-few mapping of bits. U.S. Pat. No. 5,309,516 does not employ file headers, provide for the checking of the integrity of the encrypted files and headers, or use a many-to-few bit mapping in its key generation to frustrate brute force attacks. U.S. Pat. No. 5,495,533 discloses the use of file headers, file trailers, and a message authentication check field in the header to protect against any modifications to the header fields. The patent does not disclose the use of the file header in the generation of an encryption key, the generation of a deterministic but non-predictable symmetric encryption key, or the use of file trailers at the end of an encrypted message file to authenticate the encrypted message file header.

General information related to file encryption techniques may be found in "Applied Cryptography", by Bruce Schneier, John Wiley & Sons, Inc., 1996; and "Cryptography: A New Dimension In Computer Data Security", by Meyer and Matyas, John Wiley & Sons, Inc., 1982.

In the present invention, a constant value associated with an information file and a secret E-Key Seed are used to generate a deterministic but non-predictable, pseudo-random, symmetric encryption key which obviates the need for key directories or other key records to recover the key. The key generation method which is used employs two many-to-few bit mappings to make the encryption key highly resistive to brute force trial and error attacks, and a secure hash function which produces a message digest of constant binary length (no matter the binary length of the input) to defeat any attempt to discover the inputs necessary to regenerate the key. The information file thereafter is encrypted with the deterministic encryption key which is destroyed upon use, and the encrypted information file and constant value are concatenated to place the constant value in the header at the beginning of the encrypted information file. The concatenation is operated upon by a secure hash function to produce a message integrity code (MIC). The MIC, a redundant constant value, and a redundant checksum are stored as trailers to the encrypted information file, and are used to verify the integrity of the encrypted information file and file header, and to recover a constant value in the event the encrypted information file has been corrupted.

SUMMARY OF THE INVENTION

A method and system is disclosed for protecting sensitive information files and messages from access by unauthorized parties, whether stored in a computer memory or exchanged over a transfer medium between sending and receiving stations.

Each document or message file is created in normal operation. A constant value or message is logically combined to a secret bit sequence (E-Key Seed) to perform a many-to-few bit mapping which shuffles the bits and provides a pseudo-random result. The result then is applied through a secure hash function generator to perform a second many-to-few bit mapping and provide a pseudo-random message digest. The message digest in turn may be truncated to a desired bit length to provide a deterministic but non-predictable, pseudo-random, symmetric encryption key which is used to encrypt the message or information file to be protected. The deterministic encryption key is destroyed immediately after use. The constant value and encrypted message thereupon are secure hashed to create a message integrity code (MIC) that is used to detect any alterations to the encrypted information file that may have occurred intentionally or unintentionally.

In one alternative embodiment of the invention, both a constant value and a checksum bit sequence are added as a header at the beginning of an encrypted file, and a redundant constant value and checksum bit sequence are added after the message integrity code as a trailer at the end of the encrypted file to accommodate recovery of a constant value that may have been corrupted.

BRIEF DESCRIPTION OF THE DRAWINGS

Additional objects, features and advantages of the present invention will become apparent from the following detailed description when read in conjunction with the accompanying drawings in which.

DESCRIPTION OF PREFERRED EMBODIMENTS

Preferred embodiments of the invention will now be described with reference to the accompanying drawings.

The term "pseudo-random" as used in this specification means that the output referred to is repeatable and predictable to anyone who knows the E-Key Seed input to the function producing the output. Without such knowledge, the output appears to be totally random.

The term "concatenation" means that one bit field is juxtaposed to another.

Figure 1:
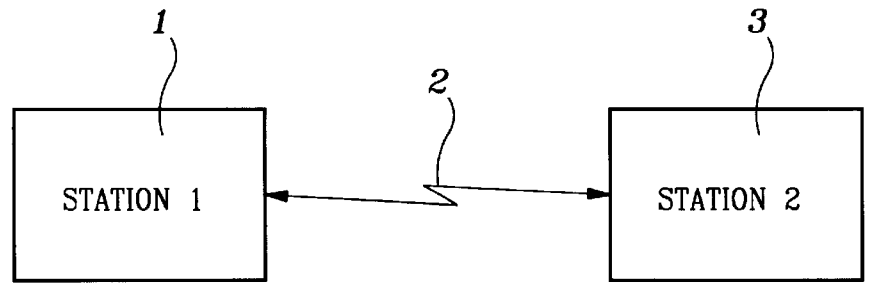
FIG. 1 is a functional block diagram of an encrypted file transmission system of which the present invention is a part.

Referring to FIG. 1, a first station 1 which may comprise a personal computer, workstation, or server desires to transfer information by way of a transmission medium 2 to a second station 3. The medium 2, by way of example, may be a LAN, WAN, VAN (value added network such as MCI or Sprint), or TELCO (telephone exchange) communication link, the Internet, a local intranet, or a wireless cellular phone link. The station 3 also may be a personal computer, workstation, server, or other computing device able to execute software code.

In order to protect the confidentiality of the file to be transferred by station 1 to station 3, conventional systems encrypt the file using an encryption key known by both the sender at station 1 and the receiving party at station 3. If the encryption key is generated through a weak cryptographic process and shared, the encrypted information may be revealed to a third party through cryptographic analysis. Further, if the key holder becomes unavailable prior to disclosing the encryption key to the receiving party, the encrypted information will be useless to the receiving party.

Figure 2:
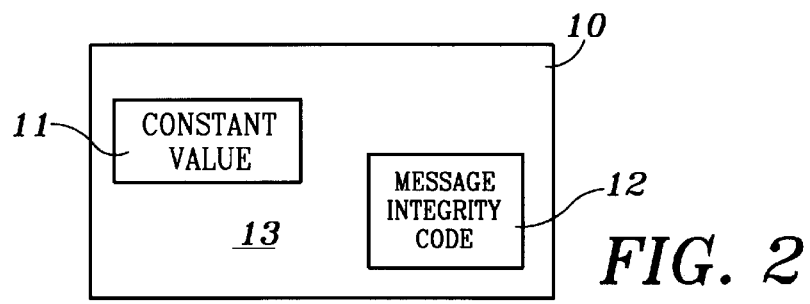
FIG. 2 is a graphical illustration of a formatted encrypted file used in the system of FIG. 1.

Referring to FIG. 2, a data file 10 is shown with a constant value 11, a message integrity code (MIC) 12, and an encrypted information area 13. In accordance with the invention, the constant value is in cleartext (not encrypted) to accommodate normal file administration processes. An encryption key is generated from the constant value and a secret E-Key Seed, and the message to be transmitted is encrypted through use of the key. A message integrity code 12 thereafter is formed by performing a secure hash on the constant value 11 and the encrypted message appearing in area 13 as will be more particularly described below.

The benefits resulting from the above method are that the message cannot be altered in any way without causing a change in the MIC 12, and that even when the integrity code indicates that the message has been altered, neither the encryption key to the encrypted message, nor the message itself has been compromised.

Figure 3:
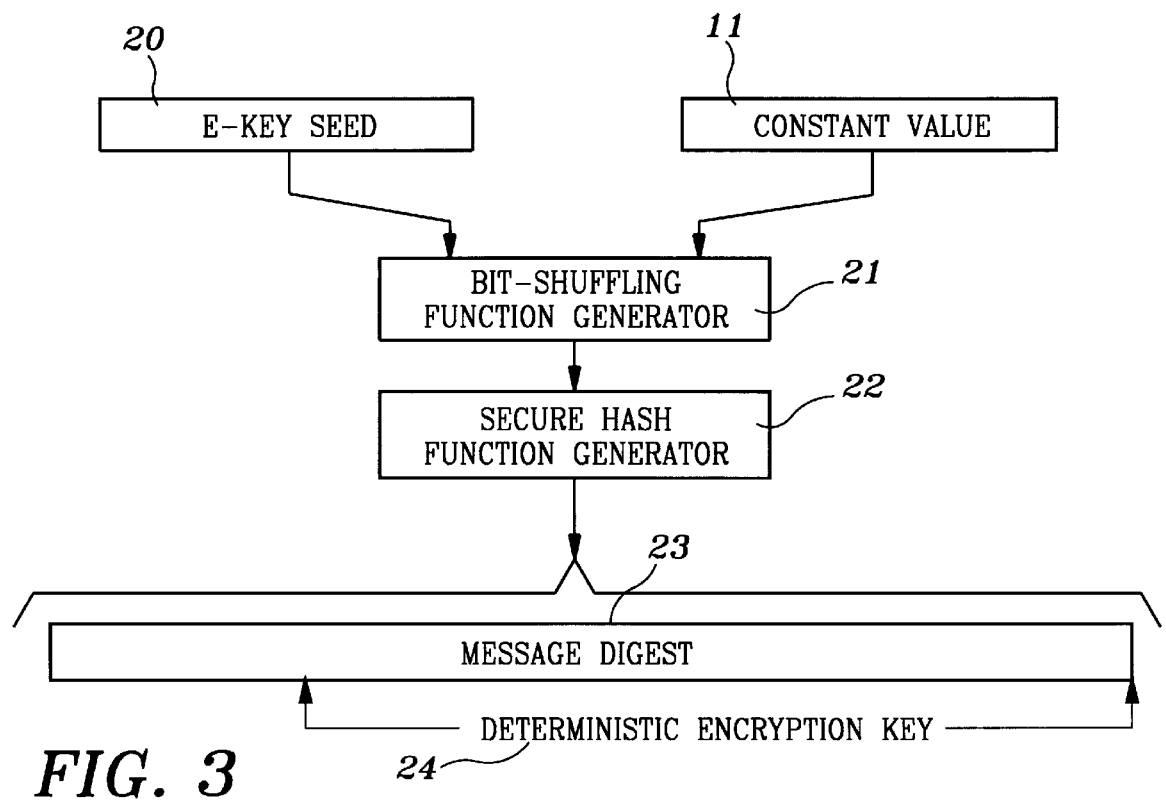
FIG. 3 is a logic flow diagram of a method of generating a symmetric, and deterministic but non-predictable encryption key in accordance with the invention by using a constant value associated with the formatted encrypted message of FIG. 2 and a secret sequence of plural bits (E-key seeds)

A further degree of security is added by using a strong cryptographic method to generate the encryption key. Referring to FIG. 3, an E-Key Seed 20 and constant value 11 are fed through a bit shuffling function generator 21 that executes, by way of example and not limitation, the logic function A⊕B=C, where A is the E-Key Seed 20 and B is the constant value 11. The bits of the E-Key Seed 20 and the constant value 11 thereby are randomly mixed and mapped from a large binary length to a smaller binary length. The bit shuffling algorithm continues to shuffle bits by wrapping the smaller of the inputs with the larger of the inputs until all bits of the larger input have been processed. The result C is applied as an input to a secure hash function generator 22 to produce a message digest 23. The hash algorithm performed by the function generator 22 provides a deterministic but non-predictable result. That is, the encryption key may be used to both encrypt and decrypt information files, and when a same input is used, the same encryption key is generated. However, even when the constant value is known, the encryption key that results from the bit shuffling and hashing cannot be predicted. Further, the output changes dramatically, if even one bit of the input is changed.

The hash function may be any of the well-known hash functions including those set forth in Table I below. In the preferred embodiment, the SHA or secure hash algorithm is used.

TABLE I

| HASH FUNCTION | HASH LENGTH |
| --- | --- |
| Abreast Davies-Meyer (with IDEA) | 128 |
| Davies-Meyer (with DES) | 64 |
| GOST Hash | 256 |
| HAVAL | Variable |
| MD5 | 128 |
| N-HASH | 128 |
| RIPE-MD | 128 |
| FIPS 180-1 (SHA) | 160 |
| SNEERU | 128 |

The message digest 23 may be truncated to provide a deterministic, non-predictable, pseudo-random, symmetric encryption key 24 which has a desired bit length. In the preferred embodiment, the desired bit length may be less than or equal to the bit length of the message digest 23. However, an alternative embodiment would perform multiple passes of the key generator operation and concatenate each pass to the previous pass(es) to create a key length greater than the message digest length normally created by the hash function. The input can be a designated part of the message digest output, an interim logic function value, or the constant value input can be divided into the number of parts which would create a key of the desired length.

It is to be understood that the bit-shuffling operation performed by the function generator 21 of FIG. 3, where two inputs (the constant value and E-Key Seed) are combined to shuffle bits, could include numerous algebraic encryption or logic functions which are executed in series to further protect the E-Key Seed from being discovered.

Figure 4:
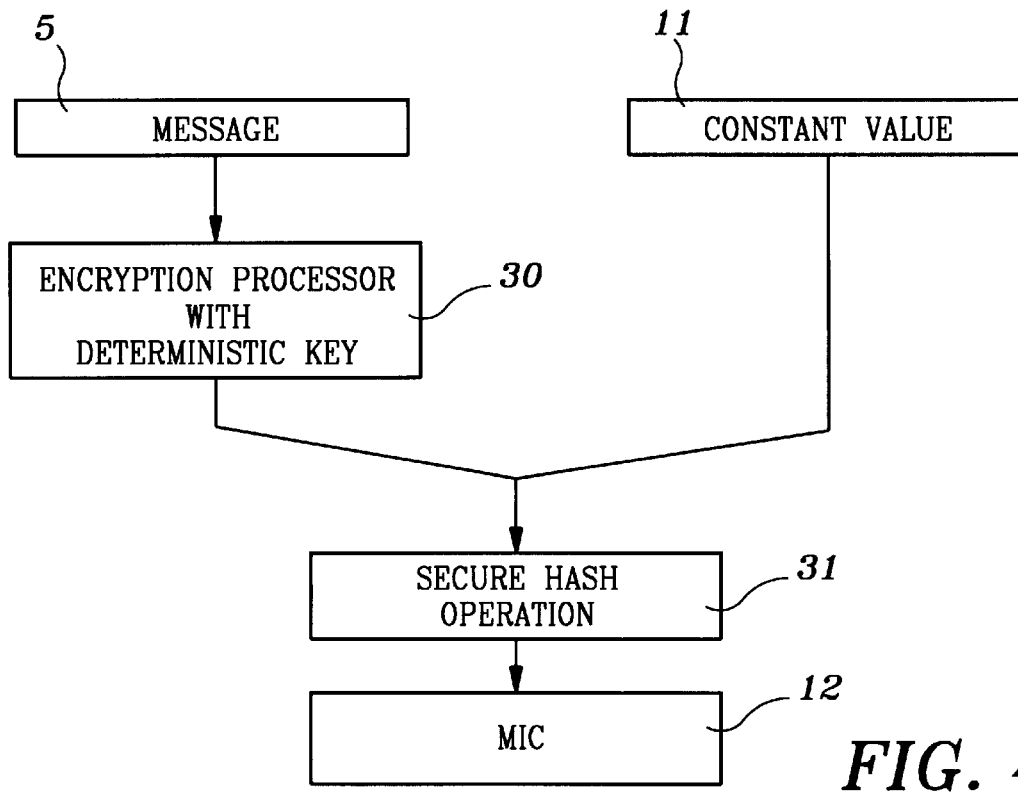
FIG. 4 is a logic flow diagram of a method for developing a message integration code (MIC)

Referring to FIG. 4, the deterministic, regenerative encryption key thus formed is used to encrypt a message or information file 5 that is to be protected. More particularly, information file 5 is applied to an encryption processor 30 where the deterministic encryption key 24 is used to encrypt the file. The encrypted file at the output of processor 30 is concatenated with the constant value 11, and the result is applied to a secure hash function generator 31 to create the message integrity code (MIC) 12 to detect alterations to the encrypted information file.

Figure 5:
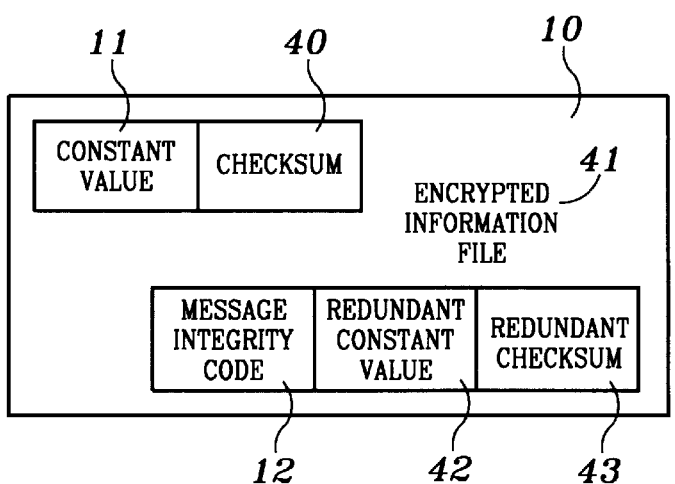
FIG. 5 is a plan illustration of a message file format which provides message integrity protection, constant value recovery, and encryption key regeneration.

Referring to FIG. 5, in an alternative embodiment of the invention, a bit sequence checksum 40 such as, by way of example, a CRC-16 checksum, is performed on the constant value 11 and added after the constant value at the beginning of an encrypted information file 41 and a redundant constant value 42 and redundant checksum 43 are added after the message integrity code 12 at the end of the encrypted information file 41. The message integrity code 12 thus is formed from the first constant value but not the redundant constant value. If a test of the message integrity code (regeneration of the MIC by the process set forth in FIG. 4 followed by a comparison of MIC codes) indicates that the message integrity is lost, the constant value 11 and redundant constant value 42 are compared. If they match, the encryption key can be regenerated by using the constant value 11 and E-Key Seed as before described in connection with the description of FIG. 3. If not, the checksum 40 and redundant checksum 43 are tested to determine which constant value is correct.

If both the checksum 40 and the redundant checksum 43 fail to indicate a correct constant value, the user can read the cleartext constant value and cognitively correct errors. Corrections can be compared against the checksum until there is a match. If the constant value cannot be recovered, however, the encryption key cannot be regenerated and the encrypted information file is lost.

Figure 6:
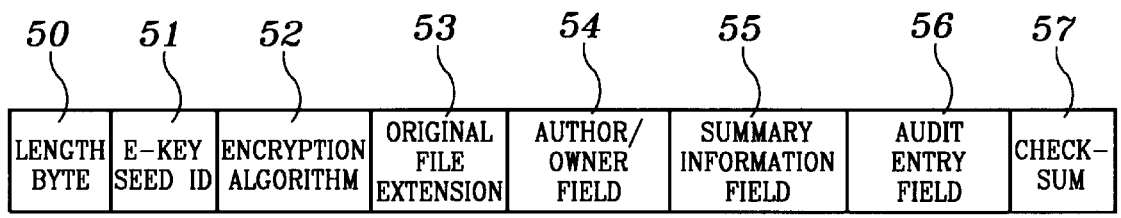
FIG. 6 is a graphical illustration of the data fields making up a cleartext constant value as used in the invention.

FIG. 6 shows the various bit fields that could make up a constant value 11. A length byte 50 indicates the total number of bytes in the constant value 11. The length byte is necessary because a number of the remaining bit fields of the constant value are of variable length. Following the length byte 50 is the E-Key Seed ID 51 which is used as a table look-up tag associated with the corresponding E-Key Seed stored in an E-Key Seed table. When the constant value 11 is first being formed, the E-Key Seed ID is automatically entered as that of the host system. A user is prompted, however, to either accept the ID or assign another. In this manner, files may be shared between PCs, workstations, and workgroups that normally use different E-Key Seeds. The encryption algorithm 52 is optional to accommodate communication interoperability between parties that normally use different encryption algorithms.

The original file extension 53 is used to keep track of the extension to the file so that it can be restored to its original state as recognized by the application program which created the file. That is, when a file is encrypted, the file is assigned a new extension so that the file manager can track the file. The next occurring bit field is the author/owner field 54 that identifies the author or owner of a file and thereby accommodates archival searches. The summary information field 55 is used by either the encryption file manager or the user. Because the constant value is concatenated to the encrypted file in cleartext, it can be used to assist in the management of the sensitive files without requiring the file to be decrypted to disclose actual contents.

The audit entry field 56 is a field created by the file manager and is used to audit compliance with security policies without risking exposure of sensitive information or invading an employee's privacy. The checksum field 57 is a simple CRC-16 translation of the constant value in its final form. A CRC-32 or other error correction algorithm could be used as well.

Once the CRC-16 calculation is completed and the result is added to the file header after the constant value 11 as illustrated in FIG. 5, the constant value header of the file cannot be changed without the user answering encrypted file manager prompts. It is to be understood that once the constant value is used to create an encryption key, any change will result in a different key and the file will not be decipherable.

In accordance with the invention, a cleartext constant value and a secret E-Key Seed are combined by one or more logic, an encryption and/or algebraic functions to provide a bit shuffling and a mapping of a large number of bits to fewerbits. The result is operated upon by a secure hash algorithm which provides a message digest which has a constant bit length output for any input, and which may be truncated to provide a deterministic, non-predictable, pseudo-random, symmetric encryption key which is not predictable. The encryption key so formed is used to encrypt the information file, and thereafter is destroyed. The encrypted information file and the constant value then are concatenated to place the constant value in the header at the beginning of the encrypted information file. The concatenation is operated upon by a secure hash algorithm to produce a message integrity code or MIC that is stored as a trailer after the end of the encrypted information file. A checksum of the constant value is calculated and added to the header of the information file after the constant value, and a redundant constant value and a redundant checksum are added as trailers after the MIC. The MIC is used to detect any alterations to the encrypted information file, and the checksums are used to recover the constant value in the event that either the constant value or the redundant constant value is corrupted.

Although particular embodiments of the invention have been described and illustrated herein, it is recognized that modifications and variations may readily occur to those skilled in the art, and consequently it is intended that the claims be interpreted to cover such modifications, variations, and equivalents. For example, the constant value 11 may be a random number or file name extension, the operand used in the bit-shuffling function generator 21 could be any algebraic, logical or encryption operand, plural bit shuffling function generators could be used before and after the secure hash function generator 22 in generation of an encryption key as illustrated in FIG. 3, and any hash function including those set forth in Table I may be the operand for the secure hash function generator 22.

The present invention has been particularly shown and described in detail with reference to preferred embodiments, which are merely illustrative of the principles of the invention and are not to be taken as limitations to its scope. Further, it will be readily understood by those skilled in the art that numerous changes and modifications may be made without departing from the spirit of the invention. For example, numerous cycles could be made through the logic flow process illustrated in FIG. 3 to increase the bit length of the deterministic encryption key cycle by cycle.

What is claimed is:

1. A method of protecting an information file from unauthorized access, which comprises the following steps:
    combining a constant value and a secret plural bit sequence in accordance with an algebraic function to shuffle bits, perform a first many-to-few bit mapping, and produce a first pseudo-random result;
    performing a secure hash operation on said first pseudo-random result to effect a second many-to-few bit mapping and produce a second pseudo-random result;
    extracting a pseudo-random, symmetric encryption key from said second pseudo-random result;
    encrypting said information file in accordance with said pseudo-random, symmetric encryption key to form an encrypted information file; and
    concatenating said constant value to a beginning of said encrypted information file.

2. The method set forth in claim 1 above further including the steps of:
    combining said encrypted information file and said constant value to form a concatenation;
    performing a secure hash operation on said concatenation to form a message integrity code;
    performing a checksum bit sequence operation on said constant value to form a checksum;
    interjecting said checksum between said constant value and said encrypted information file; and
    adding as a trailer at the end of said encrypted information file said message integrity code, said constant value, and said checksum.

3. The method of claim 1 wherein said step of combining includes a plurality of algebraic functions.

4. The method of claim 1 wherein said step of combining includes one or more logic functions.

5. The method of claim 1 wherein said step of combining includes one or more cryptographic functions.

6. The method of claim 1 further including the steps of:
    combining said encrypted information file and said constant value to form a concatenation;
    performing said secure hash operation on said concatenation to form a message integrity code;
    adding said message integrity code as a trailer after said encrypted information file;
    performing a checksum bit sequence operation on said constant value to form a checksum;
    adding said checksum after said constant value at said beginning of said encrypted information file;
    adding said constant value as a redundant constant value to said trailer at an end of said encrypted information file after said message integrity code;
    adding said checksum as a redundant checksum to said trailer at said end of said encryption information file after said redundant constant value;
    testing said message integrity code to determine whether information file integrity has been lost;
    if information file integrity has not been lost, comparing said constant value with said redundant constant value to determine whether a match occurs to indicate that said pseudo-random symmetric, encryption key may be regenerated;
    if information file integrity has been lost, testing said checksum and said redundant checksum to determine which of said constant value and said redundant constant value is correct; and
    regenerating said pseudo-random, symmetric encryption key by using a correct one of said constant value and said redundant constant value.

7. The method of claim 1, wherein said secret plural bit sequence has a binary length that is larger than that of said constant value.

8. The method of claim 2, wherein said checksum bit sequence operation is a CRC-16 checksum operation.

9. The method of claim 2, wherein said checksum bit sequence operation is a CRC-32 checksum operation.

10. The method set forth in claim 1, wherein said constant value is a data file having plural bit fields including a length byte field, an E-Key Seed ID field, an encryption algorithm field, an original file extension field, an author-owner field, a summary information field, an audit entry field, and a checksum field.

11. The method of claim 1, wherein said pseudo-random, symmetric encryption key also is deterministic and non-predictable.

12. The method of claim 6, wherein said pseudo-random, symmetric encryption key also is deterministic and non-predictable.

13. The method of claim 1, wherein any hash function is substituted for said secure hash function.

14. The method of claim 1, wherein the steps of combining and performing are executed n times, and each said second pseudo-random result is concatenated to a previous said second pseudo-random result for an increased bit length of said pseudo-random, symmetric encryption key.

15. The method of claim 2, wherein said checksum bit sequence operation is any error correction algorithm for reconstructing said constant value.

16. The method of claim 1, wherein said algebraic function is replaced by plural bit-shuffling functions.

17. The method of claim 1, wherein said pseudo-random, symmetric encryption key is destroyed after said information file is encrypted.

18. An information file structure stored on a memory system for protecting information exchanged between communication stations, which comprises:

an encrypted information file area for storing an encrypted information file which has been formed through use of an encryption key generated by combining a constant value and a secret E-Key Seed in accordance with an algebraic function and performing a secure hash operation on an output of said algebraic function;

a plural bit trailer having a message integrity code field for storing a message integrity code which is generated by forming a concatenation of said constant value and said encrypted information file and operating upon said concatenation with said secure hash operation; and a plural bit header having a constant value field concatenated to a beginning of said encrypted information file for storing a constant value, and a checksum field concatenated to said beginning next to said constant value field for storing a checksum generated by performing a checksum bit sequence operation on said constant value.

19. The information file structure of claim 18, further including:

a redundant constant value field having stored therein said constant value, and located next to said message integrity code field in said plural bit trailer; and a redundant checksum field having stored therein said checksum, and located next to said redundant constant value field in said plural bit trailer.

* * * * *